P. SUYDAM.
Miter-Boxes.
No. 147,875.    Patented Feb. 24, 1874.
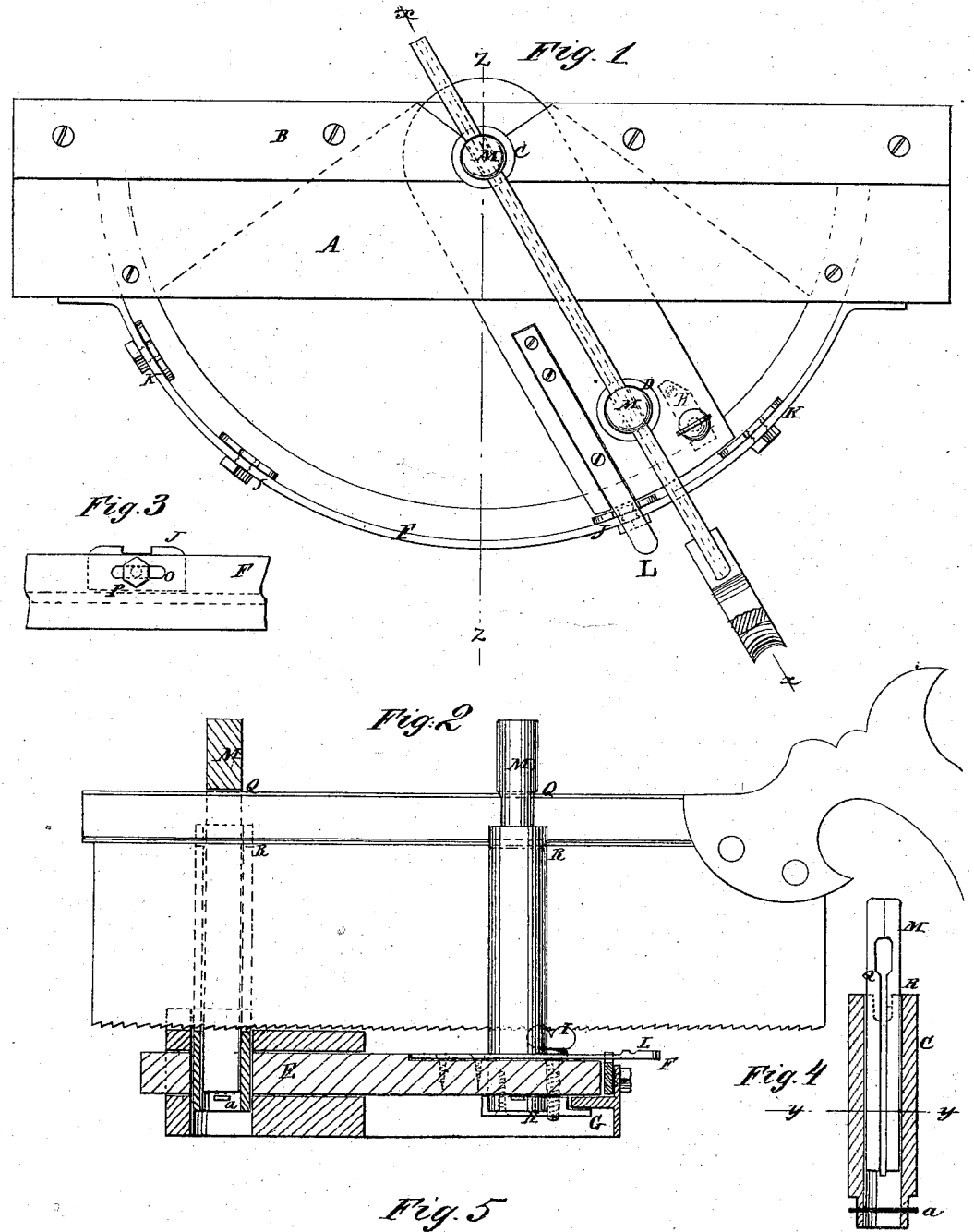
WITNESSES:    INVENTOR:
    P. Suydam
    BY
    ATTORNEYS.

UNITED STATES PATENT OFFICE.

PETER SUYDAM, OF NEW BRUNSWICK, NEW JERSEY.

IMPROVEMENT IN MITER-BOXES.

Specification forming part of Letters Patent No. 147,875, dated February 24, 1874; application filed December 29, 1873.

*To all whom it may concern:*

Be it known that I, PETER SUYDAM, of New Brunswick, in the county of Middlesex and State of New Jersey, have invented a new and Improved Miter-Box, of which the following is a specification:

The invention consists in the improvement of miter-machines, as hereinafter described, and pointed out in the claims.

Figure 1 is a plan view of my improved machine. Fig. 2 is a transverse section taken on the line *x x* of Fig. 1. Fig. 3 is a detail of the clips. Fig. 4 is a sectional elevation of a modified arrangement of the saw-guides and tubes, and Fig. 5 is a cross-section of Fig. 4 on the line *y y*.

Similar letters of reference indicate corresponding parts.

A is the bottom, and B the side, of cutting-box, whereon the stuff to be cut is held. C and D are the saw-guide-holding tubes. They are mounted on the swinging block E, which is under the bottom A of the box, and it is pivoted in the axis of the tube C, which is in the side piece B, to swing horizontally either way from the transverse line *z z* along the circular bar F, and the flange G to be fastened to the latter at any point by the clamp-nut H and screw I, or to the former at the stops J K by a spring-catch, L, to be set in the first case for any angles required, and in the latter for special angles, as, for square miters, in stops K, and octagonal ones on stops J. The stops J K are made so that the spring-clip will rise up from either side to fall with them. The saw-guide tubes are slotted from the top to the bottom board A, to allow the saw to work down thereto. M represents the slotted wood bearings, which are applied to the saw, and fit in the tubes snugly to serve for bearings for the sides of the saw, and to settle down in the tubes as the saw works down in the stuff being sawed. The slots in these bearings are only as wide as the thickness of the saw, so that the saw is confined snugly at the sides, and prevented from being loose or slack; also, the sides of the bearings are prevented from being cut by the saw-teeth except in a small portion, as they otherwise would be throughout the whole length, so as to quickly ruin them if the saw was allowed to move down along the sides of stationary guides. The stop-plates J K are attached to the bar F by slotted holes O in the said bar for the fastening-bolts P, or in any equivalent way to allow of shifting said stops slightly to vary them for cutting the miters scant or full, as is sometimes required.

The tubes and the guides may be modified in respect of the form of the bore of the one and the exterior of the other, as shown by Fig. 5, if preferred, which may, perhaps, be better in some respects.

When so made the tubes will probably be cast and the guides will be made of two pieces fastened together. The tubes may, also, in such a case, be cast in two parts and planed out smooth for the guides M, and then fastened together below the slot for the saw.

For back-saws, which are mostly used for sawing miters, the guides will be mortised near the top, as at Q, for the back to run in, and the tubes will be widened in the upper part of the slot for the saw, as at R, to allow the back to descend sufficiently for the blade to pass through the work, but to arrest it as soon as it passes through.

The saw-guides M will be arrested when the saw has cut through the work, to prevent it from cutting the bottom of the box, by a pin, *a*, in the lower end of each tube C D.

For saws differing in width, guide-bearings M of different lengths may be employed.

Saws without permanent backs, known as "pony saws," may be used in the machine by fitting on temporary backs.

Having described my invention, I claim as new and desire to secure by Letters Patent—

1. The shifting stops J K, applied to slotted bar F, as and for the purpose described.
2. The combination of bar F, having flange G and stops J K, with movable block E, having spring-catch L, screw I, and clamp H, as and for the purpose set forth.

PETER SUYDAM.

Witnesses:
  A. P. THAYER,
  T. B. MOSHER.